United States Patent

Ueyoko et al.

[11] Patent Number: 5,085,260
[45] Date of Patent: Feb. 4, 1992

[54] HEAVY DUTY RADIAL TIRE WITH A CARCASS TURNUP PORTION HAVING SPECIFIC DIMENSIONS

[75] Inventors: Kiyoshi Ueyoko, Osaka; Yasuyoshi Mizukoshi, Toyota; Kazushige Ikeda, Kobe; Munemitsu Yamada, Akashi, all of Japan

[73] Assignee: Sumitomo Rubber Industries, Ltd., Hyogo, Japan

[21] Appl. No.: 291,228

[22] Filed: Dec. 28, 1988

[51] Int. Cl.$^5$ .............. B60C 9/02; B60C 15/00
[52] U.S. Cl. .................. 152/554; 152/539; 152/546; 152/552; 152/556
[58] Field of Search ........... 152/546, 554, 543, 552, 152/540, 548, 560, 556, 564, 451, 539, 541, 544, 549, 553, 379.5

[56] References Cited

U.S. PATENT DOCUMENTS

| | | | |
|---|---|---|---|
| 3,245,455 | 4/1966 | Lewis | 152/543 |
| 3,419,059 | 12/1968 | Bridge, Jr. | 152/556 |
| 3,548,912 | 12/1970 | Rye et al. | 152/543 X |
| 4,261,405 | 4/1981 | Yamauchi et al. | 152/541 |
| 4,688,617 | 8/1987 | Hopkins et al. | 152/554 |
| 4,716,951 | 1/1988 | Suzuki et al. | 152/548 |
| 4,726,408 | 2/1988 | Alie et al. | 152/555 |

FOREIGN PATENT DOCUMENTS

| | | | |
|---|---|---|---|
| 3346337 | 6/1985 | Fed. Rep. of Germany | 152/451 |
| 60-50002 | 3/1985 | Japan | 152/556 |

Primary Examiner—Michael W. Ball
Assistant Examiner—Gregory J. Wilber
Attorney, Agent, or Firm—Birch, Stewart, Kolasch & Birch

[57] ABSTRACT

A heavy duty radial tire and rim assembly comprising a pair of bead cores, a carcass, a belt, and a pair of bead apexes, wherein in at least one of the bead portions, when the tire is mounted on a normal rim specified for the tire and inflated to a normal pressure, a thickness center line of a carcass turnup portion between two points is cured and located axially inward of a straight line drawn between the two points, the quotient (X/HR) of the axial distance (X) of the inner end (Q2) of the bead core from a bead heel point (Q1), to the height (HR) of a flange of the normal rim is in a range of 0.8 to 1.05, wherein the bead heel point (Q1) is defined as in intersection of an extension of the outer surface of the bead portion with an extension of the bead base, and the quotient (Y/HR) of the radial distance (Y) from the radially outer end (Q3) of the flange of the rim to the radially outer end (Q4) of the bead core, to the height (HR) of the flange of the rim is in a range of 0 to 0.3.

4 Claims, 6 Drawing Sheets

HEAVY DUTY RADIAL TIRE WITH A CARCASS TURNUP PORTION HAVING SPECIFIC DIMENSIONS

BACKGROUND OF THE INVENTION

The present invention relates to a radial ply tire for heavy duty use suitable for aircraft tires which is improved in bead durability, and more particularly to an improved bead structure.

The heavy duty radial tires for aircraft are used under heavy load and high speed, and therefore, the tires should essentially resist repeated large deformations due to heavy loads and high speed in order to achieve safety during aircraft takeoff and landing. Due to the recent enlargement in aircraft size and acceleration of the flight speed, such tires must be designed so as to endure not only an increased speed and load at takeoff and landing but also to endure the repeated large radial deflection when loaded, which can be, for example, 28 to 35%.

Today the widely used tires for aircraft have a, cross-ply structure. In such tires, however, the stiffness at the tread is less and the tire weight is heavy and thus neither preferable wear resistance or desirable cooling properties can be obtained. Considering the rapid enhancement of performances in large-sized jet planes, there is a limit in the amount of use which can be made of the cross-ply structured tires.

Accordingly, there is a tendency to employ radial ply tires having a belt layer composed of high modulus belt cords arranged radially outside the carcass at a small angle with regard to the tire equator.

By employing such radial ply structure for heavy duty tires such as aircraft tires, the tire life has been extended. However, it has been determined that the durability at the bead portion of the tire becomes relatively low in comparison with that of the entire tire.

It is therefore a general object of the present invention to provide a heavy duty radial ply tire which is improved in bead durability.

In radial ply tires, as a characteristic of the radial structure, a strong and rigid belt is disposed in the tread portion, and accordingly, the deformation thereof is small.

On the other hand, in aircraft tires, the deflection or deformation when loaded is significantly large because of the action of heavier loads in comparison with tires in other fields, for example, those for passenger cars.

Accordingly, the sidewall portions and the bead portions of the tire become subjected to severe deformation due to the increase in the load as compared with radial tires in other fields and furthermore the aircraft tires of a bias structure.

Above all, since a bead apex of a comparatively large hardness rubber, which develops heat largely by deformation, is disposed in each bead region, the temperature of the bead apex rises due to the heat generated by the repeated deformation during the operations of takeoff and landing.

Moreover, a large number of reinforcement layers, such as carcass plies, bead reinforcing plies, etc. are placed in the bead portions, and accordingly the thickness thereof is increased. Therefore, when the bead portion is subjected to bending deformation, a large shear strain is produced between the adjacent plies, which induces breakage of the tire bead portion.

It is therefore another object of the present invention to provide a heavy duty radial ply tire in which, in order to prevent the breakage of the tire bead portion, a reduction in both the heat generation and the shear strain is achieved by arranging the bead core in a specific position relative to the wheel rim and by preliminarily forming the bead apex in a shape similar to that when the tire is loaded.

On the other hand, it was known that the breakage of the bead often appeared near the radially outer edge of the rim flange. This is explained as follows: When the deflection in the radial direction of the tire while loaded is as large as 28 to 35% as stated above, as shown roughly in FIG. 7, a tensile force is generated in the axially inside portion of the carcass (e) or generally the main portion (j) of the carcass, and in contrast therewith, a compressive stress is applied to the outside portion thereof such as the carcass ply turnup portion (h) turned up around the bead core (f), and when the bead portion is sharply folded over the rim flange (g), the compressive stress concentrates to build up a large compressive stress at the carcass placed in the folded portion, and such stress is repeated during the tire rotation. Accordingly, the ply cords are fatigued and finally broken. Furthermore, the broken ends give rise to the local concentration of compressive stress. Such repeated compressive stress leads to the breakage of bead.

In the conventional tires, the bead apex is designed to be thicker and taller in order to lessen the elastic deformation of the bead portion, and the distance between the turnup portion (h) and the main portion (j) of the carcass (e) is accordingly increased. As the result, the above-mentioned repeated compressive stress is also increased.

The inventors recognized that in order to reduce the compressive stress at the carcass turnup portion (h), it is effective to bring the radially outer edge close to the neutral line U in the bending of the bead portion.

To explain further in detail, assuming the deformation of the bead is constant under the conditions of high pressure and heavy load, the strain $\epsilon$ of the carcass is expressed in the following equation:

$$\epsilon = y/R \quad (1)$$

where
- R: radius of curvature of the carcass and
- y: distance from the neutral line U in bending to the outside of the turnup portion of the carcass.

That is, the strain $\epsilon$ of the carcass becomes smaller as the distance y is shorter, if it is assumed that R is substantially constant.

On the other hand, the fact that the deformation is not uniform depending on the strength of the carcass (e) yields the following equation:

$$R = EI/M \quad (2)$$

where
- E: Young's modulus
- I: moment of inertia of area
- M: bending moment applied at the bead.

In addition, since the moment of inertia of area I and the thickness T of the bead have the relation $$I \propto T^3 \quad (3)$$

equations (1), (2) and (3) deduce the relation $$\epsilon = y/R = \frac{y}{EI/M} = k\frac{yM}{ET^3}$$

(k: a constant)

As a consequence, it was discovered that the strain $\epsilon$ can be minimized by causing the axially outside of the carcass turnup portion to approach the above-mentioned neutral line U, and contacting the carcass turnup portion (h) with the carcass main portion (j), and further reducing the quantity of rubber in the triangular sectional region between the turnup portion and main portion of the carcass by making the bead apex smaller.

It is therefore another object of the present invention to provide a heavy duty radial ply tire in which, in order to improve the durability of the bead portion by alleviating the fatigue of the carcass cords caused by the repeated deformations, the compressive stress on the turnup portion is reduced by defining the height of the bead apex and the position of the carcass turnup portion with relation to the bead core and the rim flange.

SUMMARY OF THE INVENTION

According to one aspect of the present invention, in order to reduce the heat generation and the shear strain, a heavy duty radial tire is characterized in that, when the tire is mounted on a normal rim specified for the tire and inflated to a normal pressure, the quotient (X/HR) of the axial distance (X) of the inner end (Q2) of the bead core from a bead heel point (Q1), to the height (HR) of a flange of the normal rim is in a range of 0.8 to 1.05, wherein the bead heel point (Q1) is defined as an intersection of an extension of the outer surface of the bead portion with an extension of the bead base, and the quotient (Y/HR) of the radial distance (Y) from the radially outer end (Q3) of the flange of the rim to the radially outer end (Q4) of the bead core, to the height (HR) of the flange of the rim is in a range of 0 to 0.3.

According to another aspect of the present invention, in order to reduce the compressive stress on the carcass turnup portion, the heavy duty radial tire is characterized in that, the height (HB) of the radially outer end of the bead apex from the bead base is larger than the height (HR) of a flange of a rim specified for the tire from the rim base;

the height (HB) of the radially outer end of the bead apex from the bead base is smaller than the height (H1) of the lowest turnup portion in the turnup portions of the carcass plies in the carcass turnup portion;

the thickness center (N) of the carcass turnup portion is located axially inward of a straight line drawn between points P1 and P2, where the point P1 is an intersection of the center (N) with a straight line (L2) passing through the center of gravity of the bead core in the axial direction of the tire, and the point P2 is an intersection of a line (L1) passing through the radially outer end (Q3) of the flange of the rim with a line (V1) passing through the point P1 and inclined axially inwardly at an angle (alfa) between 0 to 20 degrees with respect the radial direction of the tire; and the turnup portion of one carcass ply adjacent to the bead core contacts with the carcass main portion in a range (L) and the other carcass ply or plies terminate in the range (L).

BRIEF DESCRIPTION OF THE DRAWINGS

The present invention will now be described in detail with reference to the accompanying drawings, in which.

Figure 1:
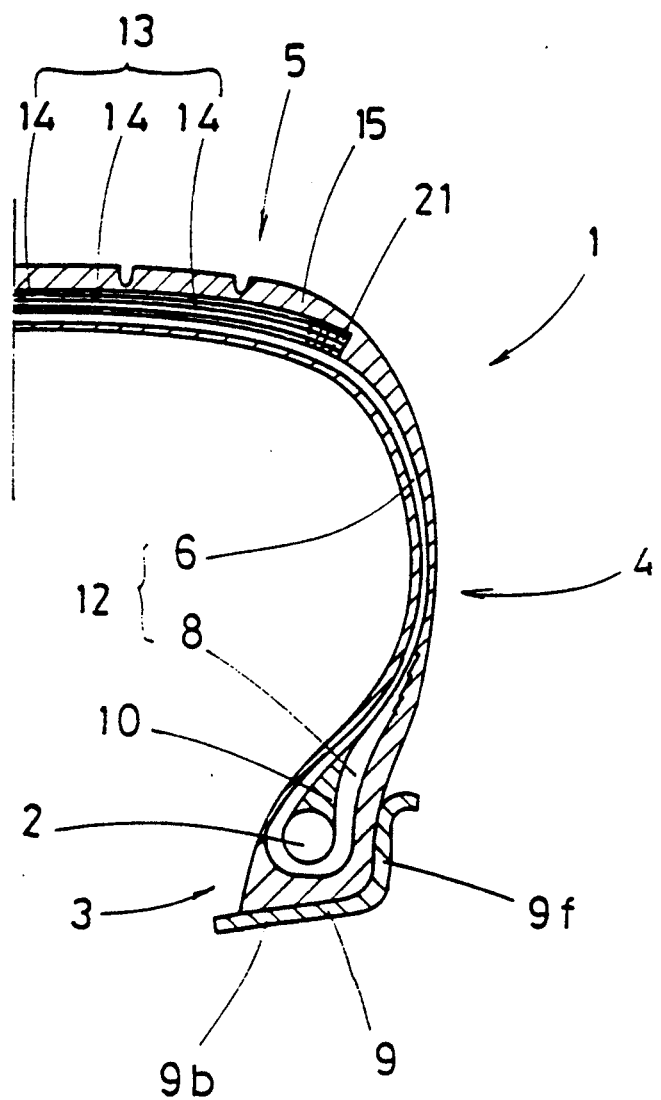
FIG. 1 is a sketch showing roughly a right-half section of an embodiment of the present invention.

In the drawings (FIG. 1), a heavy duty radial ply tire 1 of the present invention has a pair of bead portions 3, a tread portion 5, and a pair of sidewall portions 4 one extending from each edge of the tread portion to the bead portion, and the tire 1 is mounted on a normal rim 9 specified for the tire 1 and inflated to a normal inner pressure.

The tire 1 comprises: a pair of bead cores 2 one disposed in each bead portion 3; a carcass 7 extended between the bead portions 3; a tread disposed radially outside the carcass to form the tread portion 5; a pair of sidewalls disposed one on each side of the carcass to form the sidewall portions 4; a belt 13 disposed between the tread and the carcass; and a pair of bead apexes 10 disposed radially outwardly of the respective bead cores.

The rim 9 includes a pair of flanges 9f extending radially outwardly from the rim base 9b.

The carcass 7 comprises at least one ply of parallel cords 12 arranged at angles of 75 to 95 degrees to the equatorial plane of the tire, and turned up in both end portions around the bead cores from the axially inside to the outside thereof to be secured thereto.

For the carcass ply cords 12, preferably, organic fiber cords such as nylon, rayon, aromatic polyamide and/or the like can be used. However, metal cords may be used therefor.

The belt 13 comprises at least two plies of cords located radially outside the carcass crown, and for the belt cords, the same material as that of the carcass ply cords is used, but some other materials may be used.

The bead apex 10 is disposed between the turnup portion and main portion of the carcass, and its sectional shape is a substantially triangle, that is, the bead apex extends taperingly from the bead core toward the radially outside thereof or toward the sidewall region 4.

Incidentally, the sectional shape of the bead core can be formed in a hexagon, a circle, a rectangle, etc..

Figure 2:
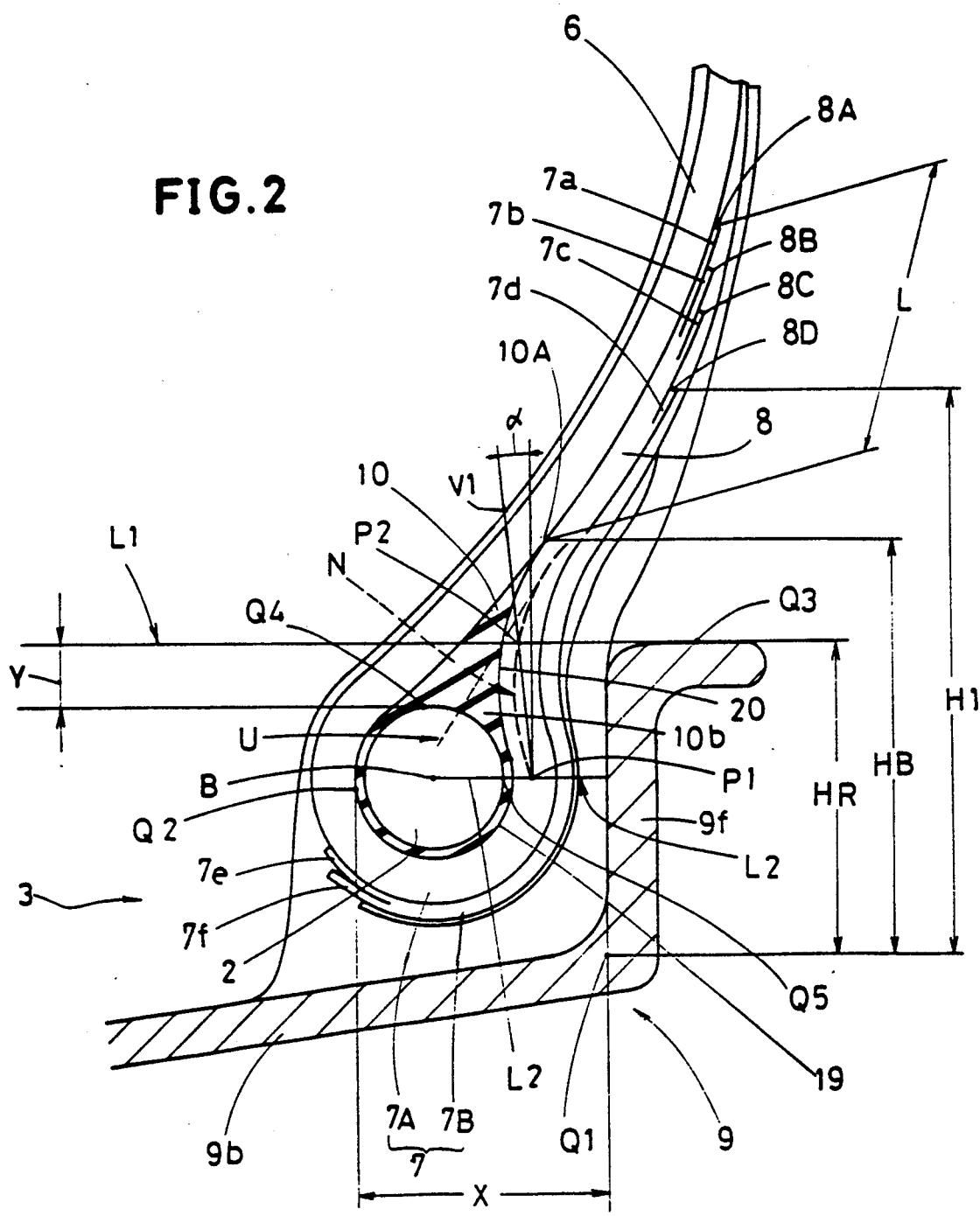
FIG. 2 is a enlarged sectional view showing the bead portion thereof.

In FIGS. 1 and 2, which show an aircraft radial tire for an embodiment of the present invention, the carcass 7 comprises an inner layer 7A turned up in both the edge portions around the bead core from the axially inside to the outside thereof and an outer layer 7B extended in both the edge portions along the axially outside of the turnup portion 8 of the inner layer. Each layer is composed of plural plies of the carcass cords, for example, the inner layer composed of four plies 7a, 7b, 7c and 7d and the outer layer two plies 7e and 7f.

The carcass cords 12 are made of organic fibers and arranged radially at 75 to 90 degrees with respect to the equator of the tire.

Furthermore, between the carcass, in this example, the ply 7a and the bead wire of the bead core, there is disposed a thin bead chafer 19 made of hard rubber for preventing the wear of the carcass which moves around the bead core like a belt on a pulley when subjected to the repeated deformations of the tire.

When the tire 1 is mounted on the rim 1, the rim flange 9f extends radially outwardly from the rim base 9b along the outside of the tire bead portion 3, and the reference HR indicates the radially outward extent thereof, that is, the flange height which is defined as a radial distance measured from the bead base line to the radially outer end Q3 of the rim flange 9f.

Figure 7:
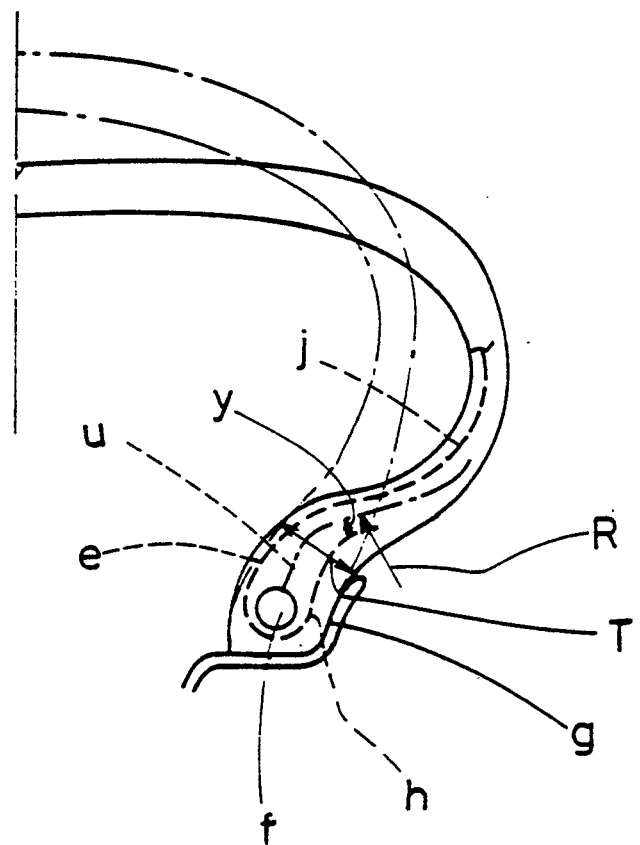
FIG. 7 is a sketch showing the deformation of the tire when loaded.

In the bead region of the heavy duty radial tires such as an aircraft tire, when the tire is loaded, the axially outward bending deformation is generated mainly in the part radially outside the radially outer end Q3 of the rim flange 9f as shown in FIG. 7, and in the prior art tires, by such repeated deformations, the heat was generated mainly from the rubber of the bead apex. It is therefore possible to reduce the deformation and the heat generation by preliminarily forming the bead apex 10 in a similar shape to the deformed shape by the load.

For that, in each bead region of the tire, as shown in FIG. 2, the bead core is defined as follows:

the quotient X/HR of the axial distance X of the inner end Q2 of the bead core 2 from the bead heel point Q1, to the flange height HR should be in a range not less than 0.8 and not more than 1.05, where the bead heel point Q1 is defined as an intersection of an extending line of the inner surface of the rim flange 9f with an extending line of the bead base line;

the radially outer end Q4 of the bead core is located radially inward of the radially outer end Q3 of the rim flange 9f; and the quotient Y/HR of the radial distance Y between the radially outer end Q4 of the bead core and the radially outer end Q3 of the rim flange 9f, to the flange height HR is set to be not less than 0 and not more than 0.3.

Further, on a line drawn radially outwardly from the center of gravity B of the bead core 2 in its section at a right angle to the axial direction of the tire, a diameter D1 at the radially inner end of the bead core, a diameter D2 at the rim base or the bead seat of the rim, and a diameter D3 at the bead base of the tire demounted from the rim satisfy the following relation:

$$(D1-D3)/(D1-D2) = 1.15 \text{ to } 1.31.$$

That is, on a line drawn radially outwardly from the center of gravity B of the bead core 2 in its section at a right angle to the axial direction of the tire, the distance of the bead base from the radially inner end of the bead core when the tire is demounted from the rim, is in a range of 115 to 131% of the distance of the rim base from the radially inner end of the bead core when the tire is mounted on the rim.

The bead core is, meanwhile, formed in a circular sectional shape.

Further, the bead apex 10 fills the triangular space formed by the bead core 2, the carcass main portion 6 and the carcass turnup portion 8, and accordingly it has a triangular section extending taperingly. The bead apex is made of a relatively hard rubber with a JIS A hardness of 65 to 90. The radial height HB of the radially outer end 10A of the bead apex 10 should be larger than the flange height HR of the rim flange.

As the relative position of the bead core 2 to the rim 9 determines an approximate shape of the main part 10b of the bead apex where deformation and heat by load arouse problems, in the present invention, by setting the quotient X/HR and Y/HR in the bead core 2 in the ranges stated above, the shape can be preliminarily formed similar to that in the loaded state, that is, the difference between the loaded shape and unloaded shape becomes decreased, and the heat generation can be lessened.

If the quotient X/HR is less than 0.80, the deformation and heat generation cannot be expected to decrease. When the quotient X/HR becomes larger than 1.05, the volume of the bead portion 3 becomes excessively large, and the bead core 2 departs from the rim flange 9f too far so as to bring about adverse effects on the durability and the bead seating, and further the production of such tire becomes difficult. Therefore, the quotient X/HR is in the range of 0.80 to 1.05, and more preferably not more than 1.0.

Further, if the quotient Y/HR exceeds 0.30, the object of this invention cannot be attained. If it is less than 0, that is, if the radially outer end Q4 of the bead core 2 is located radially outside the outer end Q3 of the rim flange 9f, the bending of the carcass is concentrated around the outer end Q4, which leads to the breakage of the carcass 7 itself.

If the ratio (D1−D3)/(D1−D2) becomes smaller than 1.15, it becomes difficult to improve the bead durability. If the ratio is more than 1.31, it becomes hard to mount the tire on a normal rim.

In this way, by reducing the deformation of the bead apex when loaded, the heat generation of the bead apex which forces the use of rubber with a high heat generating property, can be reduced, and it becomes possible to reduce the temperature rise at the bead portion while traveling and also it becomes possible to decrease the shear strain caused between the reinforcement plies. As the result, the structural durability of the bead is improved.

In the turnup portion 8 of the inner layer 7A of the carcass in this embodiment, the carcass plies 7a, 7b, 7c and 7d are arranged axially outwardly in that order, and the outer the ply, the height of the radially outer end (8A, 8B, 8C, 8D) is lower. That is, in the adjacent two plies, the height of the inner ply is higher than that of the outer ply. Further, the turnup portion 8 and the main portion 6 of the inner layer of the carcass 2 contact with each other from the outer end of the turnup portion 8 or the outer end 8A of the highest turnup portion of the ply 7a toward the radially inside thereof in a certain range L, and the radially outer ends 8B, 8C and 8D of the other carcass plies 7b, 7c and 7d are terminated in this range L. The height H1 of the lowest turnup portion of the carcass ply 7d is higher than the height HB of the tip 10A of the bead apex 10.

Accordingly, in this example, the outer end 10A of the bead apex 10 is located in the range between the outer end Q3 of the rim flange and the outer end 8D of the lowest turnup portion of the carcass ply.

As explained above, by defining the radial height HB of the tip 10A of the bead apex 10 in the specific range while forming the turnup portion 8 of the carcass in the specific structure, the strain produced by the deformation on the turnup portion 8 can be mitigated and the separation starting from the end of the turnup portion can be prevented.

Further, in this embodiment, the bead apex 10 is provided on the axially outside thereof with a concave 20, and the bottom 20 of the concave is positioned axially inside of the axially outer end Q5 of the bead core 2. Accordingly, the turnup portion 8 of the inner layer 7A of the carcass 7 along the axially outside of the bead apex, is curved similarly to the concave 20. The center line N of the turnup portion 8 passing through the center of the thickness thereof is located axially inward of a line segment P1—P2 drawn straight between points P1 and P2, where the point P1 is an intersection of the center line N with a straight line L2 passing through the center of gravity B of the bead core in the axial direction of the tire, and the point P2 is an intersection of a line L1 passing through the outer end Q3 of the rim flange with a line V1 passing through the point P1 and inclined axially inwardly at an angle (alfa) between 0 to 20 degrees with respect the radial direction of the tire.

As a consequence, in the turnup portion 8 of the carcass 7 between the intersections P1 and P2, the center line N can approach the neutral line U in bending of the bead portion 3, and the approach can lead to the decrease of the strain caused by the deformation of the carcass, especially the compressive stress generated on the axially outside of the carcass, thereby improving the resistance against fatigue of the carcass.

The carcass cord 12 in this embodiment is made of organic fibers, and the cord has such a physical characteristic that the elongation when 5 kgf tensile force is applied is 5 to 8%, the elongation when 10 kgf tensile force is applied is 9 to 12%, the elongation at breakage is not more than 28%, and the tensile strength is 140 to 170 kgf/sq.mm.

The carcass cord is relatively thin, and the diameter d thereof is not more than 1.2 mm.

Figure 3:
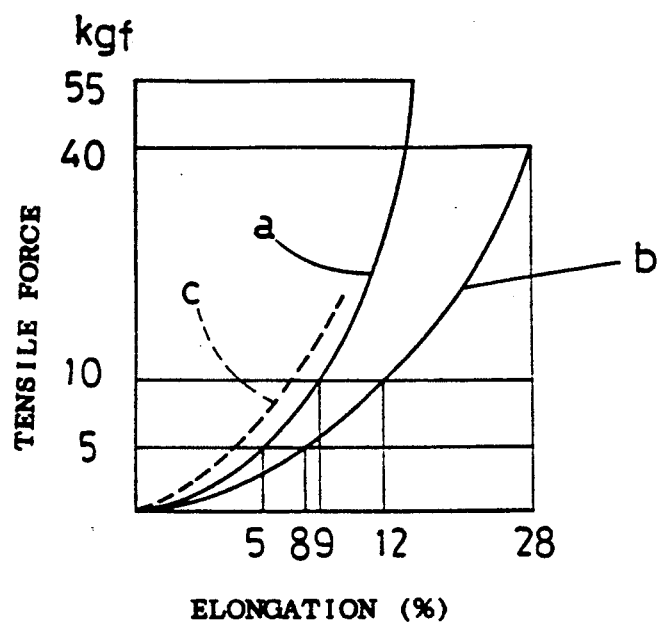
FIG. 3 is a graph showing the characteristics of organic fiber cords used as the carcass cords.
Figure 4:
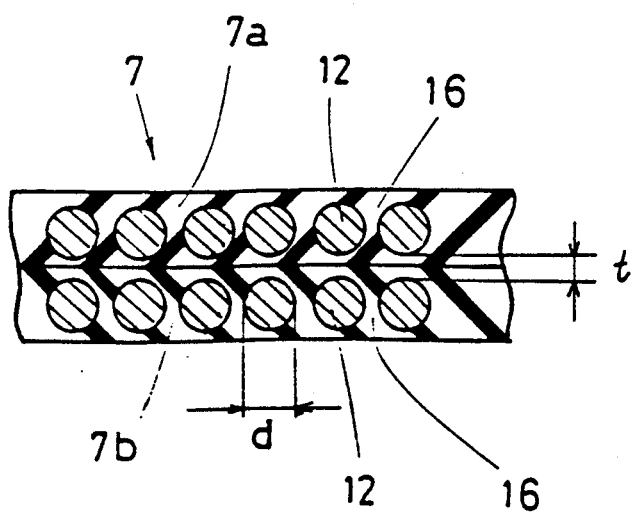
FIG. 4 is a sectional part view showing the adjacent two carcass plies.

The above-mentioned limitations to the cord elongation mean that the characteristic is defined in the specific range between the curved lines (a and b) in FIG. 3.

Incidentally, as shown by lines a and b in FIG. 3, a organic fiber cord has such a characteristic that the rate of change in elongation decreases as the load increases, and the modulus of elasticity at the elongation of 6 to 7% is referred as initial modulus of elasticity. Further, the cord which presented the curve (a) was broken at about 55 kgf tensile force, and the cord which presented the curve (b) was broken at about 40 kgf tensile force, that is, the cord strength of each cord is 55 kgf and 40 kgf, respectively. As known from the values above, a elastic cord has 10 to 11% of elongation when loaded by 16 to 25% of the cord strength. A conventionally used cord presented curve (c).

For such organic fiber cord, nylon, polyester, aliphatic polyamide, and carbon can be used, but among them, an aliphatic polyamide can satisfy the above characteristics most sufficiently.

Besides, in the pretreatment process in which tension and heat are applied on the cord for a specific period of time, by reducing the tension widely from the tension conventionally applied, the cord having the above-mentioned characteristic can be obtained.

It was confirmed that, by using such cords as having the above-mentioned elastic property, it became possible to give the carcass cord a elongation of not less than 6%, more preferably 8 to 9% being larger than the conventional tire when inflated to a normal pressure.

In this way, as the carcass cords has an elongation of not less than 6%, more preferably 8 to 9% when inflated to a normal pressure, the compressive stress acting on the carcass cords on the rim flange side when the bead portion is bent at the time of takeoff or landing is reduced. Accordingly, the compressive strain, deformations, local foldings and breakages caused by the fatigue can be prevented. Furthermore, the compressive stress of the bead rubber itself can be alleviated, which improves the durability of the bead portion 3.

The organic fiber cords 12 are coated with rubber to form the carcass plies. For the coating rubber, high modulus rubber with a superior durability having JIS A hardness of 60 to 90, 100% modulus of 30 to 100 kgf/sq.cm, tensile strength of 150 to 300 kgf/sq.cm, and elongation at breakage of 300 to 600% is used. The thickness t of the rubber coat is set to be not more than 0.8 mm. Such rubber coat facilitates the above-mentioned elongation of the carcass cords when inflated, and further the large elongation at breakage improves the durability of the bead portion.

The belt 13 in this embodiment is composed of four plies 14 of rubberized cords having substantially the same characteristics as those of the carcass cord. The belt cords 21 are inclined at 0 to 20 degrees to the tire equator and embedded in rubber.

TEST RESULTS

Radial ply tires of size 46×17R20 for aircraft were manufactured as test samples. The tires were identical except for the axial distance X of the bead core. Incidentally, nylon cords were used for the carcass cords and belt cords, and the radial distance Y was set at 15 mm.

Each tire was mounted on a normal rim of size 49×17 and inflated to a normal pressure of 14.8 kg/sq.cm, and then by using an indoor bench tester, the tire was repeatedly subjected to an acceleration test to increase the speed from 0 to 363 km/h in a period of 55 seconds while loaded with 21,000 kg.

Figure 5:
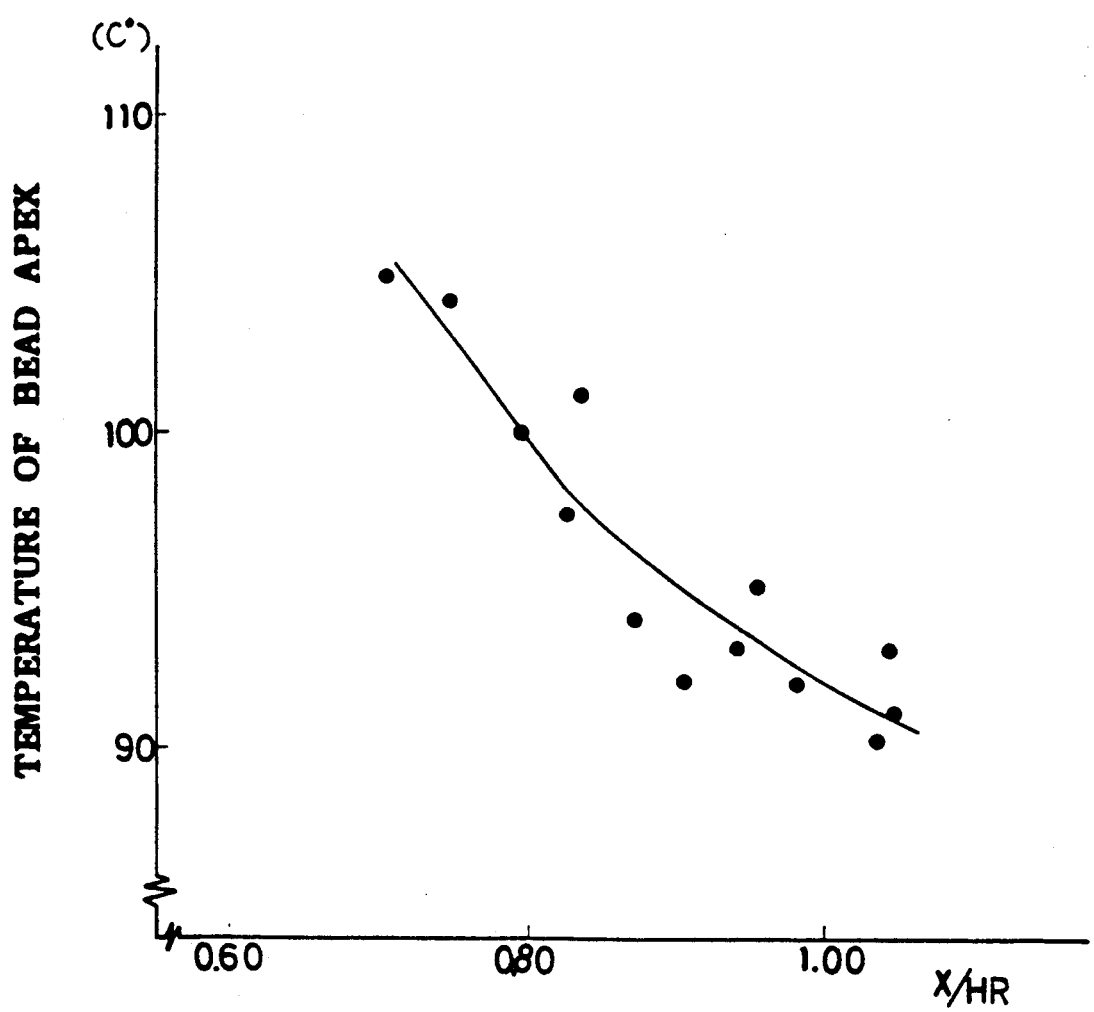
FIG. 5 is a graph showing a relationship between the temperature of bead apex and the ratio X/HR.
Figure 6:
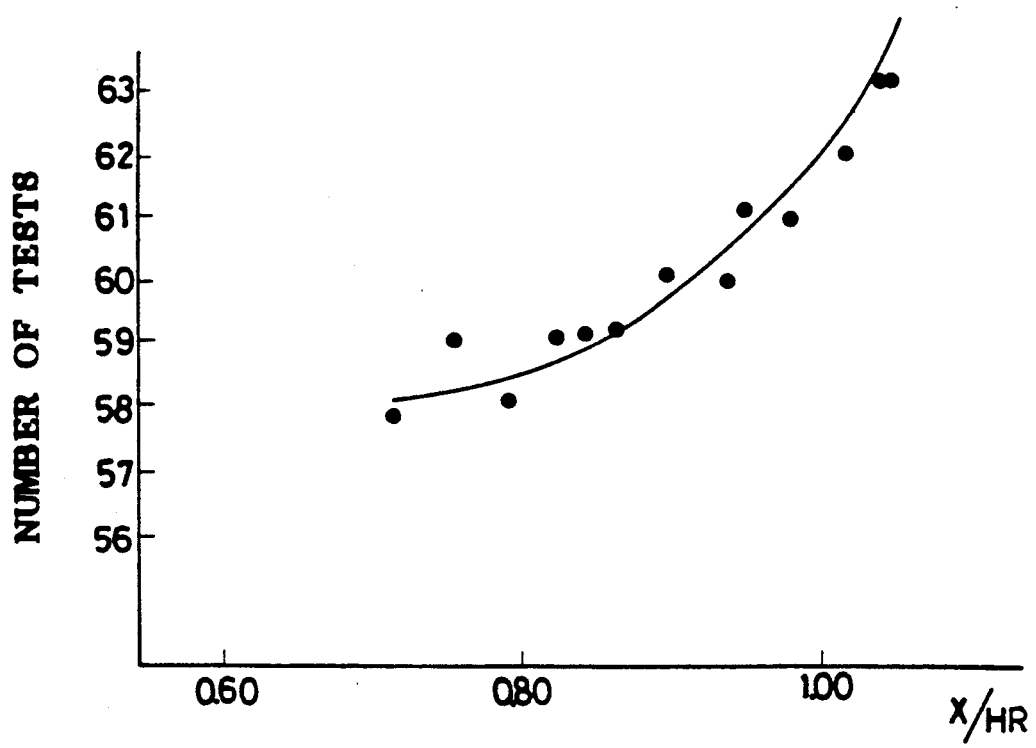
FIG. 6 is a graph showing a relationship between the number of tests (bead durability) and the ratio X/HR.

The test results are shown in FIGS. 5 and 6.

From FIG. 5, in which the axis of ordinates gives the temperature in the bead apex measured immediately after the ten-time successive acceleration tests and the axis of abscissas denotes the quotient X/HR, it is apparent that the temperature decreases as the ratio X/HR increases, and when the quotient X/HR becomes about 0.80, the temperature becomes 100 degs. C.

In FIG. 6, the axis of ordinates indicates the number of the acceleration tests when a breakage was observed at the bead portion and the axis of abscissas denotes the quotient X/HR. As the quotient X/HR increased, the number of tests became large, that is, the bead durability was improved.

Further, it was found out that it is difficult to manufacture the tire of which quotient X/HR is more than 1.05 and the bead portions of such tire did not match well with the rim. Such tire was therefore not subjected to the test.

As explained above, the axially inner end and the radially outer end of the bead core are defined in the specified ranges relative to the rim flange to make the sectional shape of the bead apex similar to that when loaded. Accordingly, the repeated deformations of the bead apex during tire rotations are lessened, and as a result, the bead durability is largely improved. Further, the height of the bead apex is limited in the specific range, and the turnup portion of the carcass ply adjacent to the bead core contacts with the main portion thereof in the range L, and the radially outer ends of the turnup portions of the other carcass plies are terminated in the contacting range L. Therefore, the stress at the turnup portions due to the tire deformation is effectively impaired, and the bead durability is enhanced.

Furthermore, the turnup portion of the carcass layer is located near the neutral line in bending of the bead portion. Accordingly, the compressive stress generated on the outer surface of the turnup portion is reduced, and the strength of the carcass against fatigue can be increased, and the bead durability is improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A tire and rim assembly comprising a rim and a radial tire mounted thereon, said radial tire comprising:

a pair of bead cores one disposed in each bead portion of the tire;

a carcass extending across the bead portions and turned up around in both edge portions around said bead cores from the axially inside to the outside thereof to form two carcass turnup portions and one carcass main portion therebetween, said carcass having at least two plies of organic fiber cords arranged at 75 to 95 degrees to the equatorial plane of the tire;

a belt disposed on the radially outside of said carcass and having at least two plies of cords;

a tread disposed radially outward of said belt; and a pair of bead apexes one disposed radially outward of each bead core between the carcass turnup portion and the carcass main portion and extending radially outwardly and taperingly from the bead core, said rim comprising:

a rim base on which the tire bead portions are seated;

a flange extending radially outwardly from the rim base along the outside of the tire bead portion, characterized in that, in at least one of the bead portions, the height (HB) of the radially outer end of said bead apex from the bead base is larger than the height (HR) of the rim flange from the rim base;

the height (HB) of the radially outer end of said bead apex from the bead base is smaller than the height (H1) of the lowest turnup portion in the turnup portions of the carcass plies in said carcass turnup portion from the bead base;

a thickness center line (N) of said carcass turnup portion between two points P1 and P2 on the center line (N) is curved so as to be located axially inward of a straight line drawn between said points P1 and P2, where the point P1 is an intersection of the center line (N) with a straight line (L2) passing through the center of gravity of the bead core in the axial direction of the tire, and the point P2 is an intersection of an axially straight line (L1) passing through the radially outer end (Q3) of said flange of the rim with a radially oriented line (V1) passing through said point P1 and inclined axially inwardly at an angle (alpha) between 0 and 20 degrees with respect to the radial direction of the tire from the point P1; and an outer edge part (L) of the turnup portion of one carcass ply adjacent to the bead core, said outer edge part (L) having a radially outer edge and a radially inner edge, said outer edge part (L) contacting the carcass main portion and the outer carcass ply or plies terminating between the radially outer edge and inner edge of said edge part (L); wherein the quotient (Y/HR) of the radial distance (Y) from the radially outer end (Q3) of said flange of the rim to the radially outer end (Q4) of the bead core, to said rim flange height (HR) is in a range of 0 to 0.3.

2. The tire and rim assembly as set forth in claim 1, wherein the carcass is made of aliphatic polyamide fiber cords of which elongation when 5 kgf tensile force is applied is 5 to 8%, and when 10 kgf tensile force is applied is 9 to 12%, and at breakage is not more than 28%, and said cords are coated with rubber having a modulus at 100% elongation of 30 to 100 kgf/sq.cm., and the thickness of the rubber coat is not more than 0.8 mm.

3. The tire and rim assembly as set forth in claim 1 or claim 2, wherein the thickness of said organic fiber cord is not more than 1.2 mm.

4. The tire and rim assembly as set forth in claim 1, wherein in said at least one of the bead portions, the quotient (X/HR) of the axial distance (X) of an axially-inner end (Q2) of the bead core from a bead heel point (Q1), to the rim flange height (HR) measured radially from the bead heel point (Q1) is in a range of 0.8 to 1.05, wherein said bead heel point (Q1) is defined as an intersection of an extending line of an inner surface of the rim flange which the tire rests against, with an extending line of the bead base line.

* * * * *